INVENTOR.
LORAND KOVACS
BY RAYMOND A. HEISLER

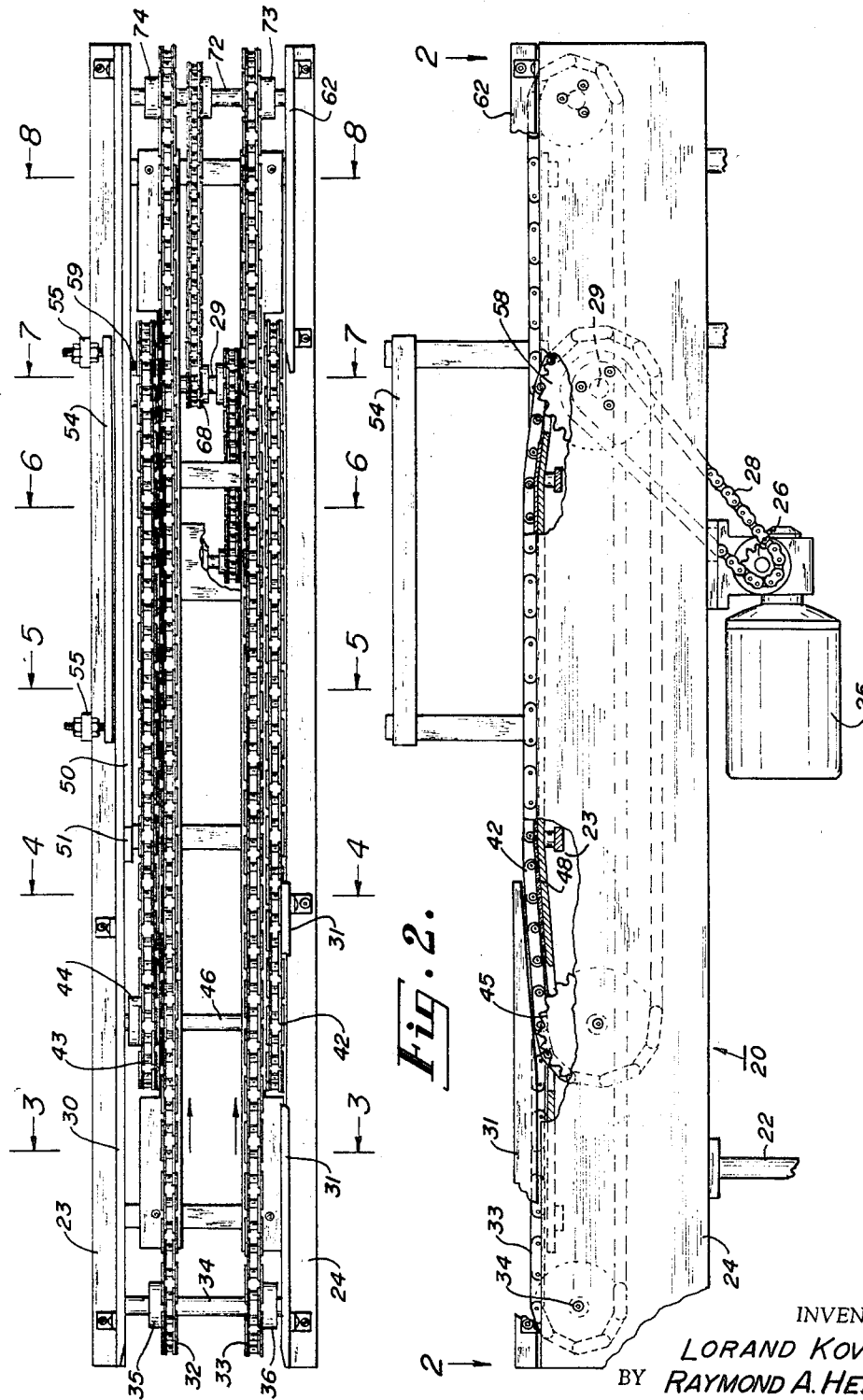

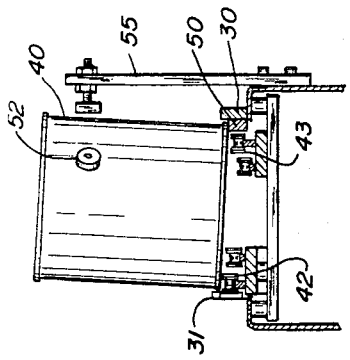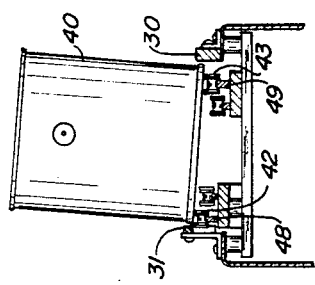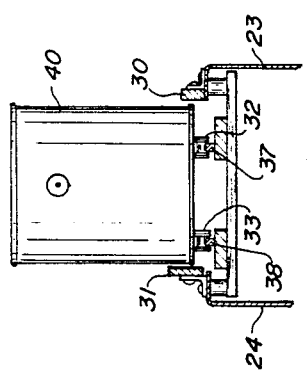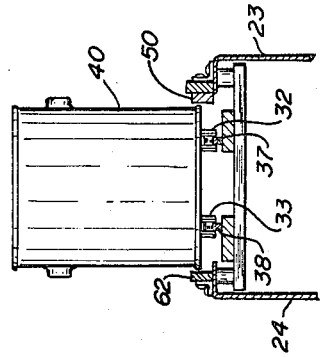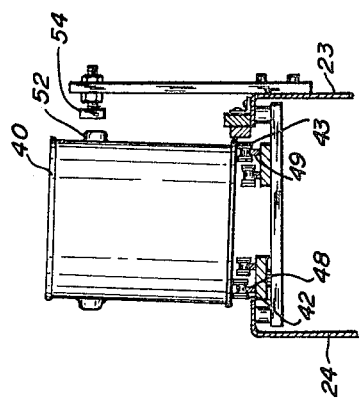

AGENT.

June 25, 1968 L. KOVACS ET AL 3,389,778
APPARATUS FOR ORIENTING EARED CONTAINERS
Filed April 20, 1967 4 Sheets-Sheet 4

INVENTOR.
LORAND KOVACS
BY RAYMOND A. HEISLER

Ralph R. Roberts
AGENT.

United States Patent Office 3,389,778
Patented June 25, 1968

3,389,778
APPARATUS FOR ORIENTING EARED CONTAINERS
Lorand Kovacs, New Milford, and Raymond A. Heisler, Franklin Lakes, N.J., assignors to The Heisler Company, Fairfield, N.J., a partnership
Filed Apr. 20, 1967, Ser. No. 632,330
15 Claims. (Cl. 198—33)

ABSTRACT OF THE DISCLOSURE

An orienting device for circular objects having protrusions thereon such as eared containers. The device is essentially a conveying mechanism in which differentially speeded chains and edge engaging means are used to cause the containers to separate and rotate as they are advanced. Upon a pair of slower moving chains an eared or like container fed to a pair of chains traveling at a higher rate of speed—one of these chains preferably being higher than the other. As the container is advanced on the higher speed chains, one edge is brought in the way of a dead plate so that the container is lifted from the lower of the high speed chains, whereupon the container is caused to rotate until an ear or protrusion of the container comes in the way of a contact rail. As its ear engages the contact rail the container is pushed laterally on the chains to move the container from the rub rail. The container is now transported upon the two higher speed chains in a precisely oriented manner after which it is transferred from the high speed conveyor chains and onto the regular conveyor chains or to other operations.

BACKGROUND OF THE INVENTION

*Field of the invention*

The field of art to which this invention relates is to the general class of power driven conveyors and in particular to the subclass of arranging articles on a conveyor and still more particularly to orienting articles on a conveyor.

*Description of the prior art*

The orienting of circular devices such as bottles and containers by means of conveying them in the way of auxiliary devices for causing rotation is well known in the art and in particular in the art pertaining to the orienting of liquor bottles and the like in which small nubs are molded upon the bottles so that the bottles may be turned to a precise position for labeling and the applying of seals to the bottle after filling. The use of conveyor chains of differential speed to cause items to rotate as they advance and in particular eared containers may be seen in the U.S. Patent No. 3,241,578 to R. A. Heisler, issued Mar. 22, 1966. Other U.S. Patents representative of the art are shown in Patents Nos. 3,136,105; 3,047,123; 2,159-318; 2,843,252; 2,825,442 and 2,984,332.

Ear engaging means is shown in U.S. Patent 3,136,105 to Eckhoff in which the containers are shifted from one oriented position to another oriented position prior to packing in a carton and without a rotation of the container. Orientation of bottles by engaging the spotting projection is shown in U.S. Patents 2,159,318 and 2,825,442 to Carter and in U.S. Patent 2,843,252 to Eddison, et al. The rotation of the bottles in these patents is by side belts or by rollers. Plural chain conveying means are shown in U.S. Patents 2,984,332 to Pierce, Jr., and 3,047,123 to McKay.

The separation of the containers so that they can be rotated for orientation is customarily by gates or similar devices which time the flow of containers so that each container is spaced on the conveyor and free to rotate as it is oriented. The gate releasing apparatus shown in these and other conveyor orienting systems are not always effective to provide positive separation of the containers on the conveyor for the orienting thereon. Gate flow control and releasing mechanisms used with present and prior orienting mechanisms are often effected by the bumping of cans and containers which push the containers onto the conveying and orienting device in other than the precisely timed and desired manner.

In high speed orientation of containers, the known or customarily used devices have difficulty in receiving and spacing eared containers as they are fed from can making machinery. Often the cans come in groups with their sides in tangential contact and they are moved onto the orienting means, often engage or contact the just ahead containers so as to disrupt their orienting spacing and orienting movement. In addition, a gate means usually causes a partial slow down in the feeding of containers, as the rate of feed of containers must be speed of conveyor plus space between containers.

In the device to be hereinafter more fully described, it is contemplated that the container orienting conveyor will receive containers oriented in any random manner and often with the containers in tangential relationship to each other. From the receipt of these containers the orienting apparatus of this invention, without the means of a gate or other flow control apparatus, advances the containers so that in turn each leading container is separated, oriented, and transported to a delivery point whereupon it is discharged from the conveyor at a determined rate of speed and with the container oriented and with succeeding cans as they pass through the orienting section of the conveyor being delivered therefrom in an oriented relationship and in no more than a tangential relationship to other oriented containers.

SUMMARY OF THE INVENTION

The orienting conveyor of this invention is contemplated to be of rather short extent; however, it may be made of any longer length desired. This conveyor includes two side frames adapted to carry a first pair of spaced roller chains traveling at the same speed and adapted to receive eared containers at the speed of and as they are delivered from a prior operation. These containers after they are advanced a short distance on the first pair of chains are transferred to a second pair of conveyor chains traveling at a higher speed—these second chains are preferably positioned alongside and parallel to the first or slow speed conveyor chains and have their upper intermediate portion of the chains raised to a position above the slower conveyor chain. In transporting the containers on the faster traveling pair of conveyor chains one of the chains may be positioned at a higher level than the other chain so that the can may be tilted a determined amount. The container as it is advanced on the faster chains may be also moved laterally by means of a guide rail or in the direction of the tilt until one side of the lower rim of the container engages and is moved forwardly upon a fixed dead plate.

As the container is advanced by the one engaging high speed conveyor chain the other side of the container is supported upon the dead plate and slides thereon. The frictional engagement of the advancing container on the dead plate causes the container to rotate. As the container is rotated, an ear of the container is brought in the way of an ear-contacting rail spaced a determined distance above the dead plate whereupon the rotation of the container and its ear or protrusion as it engages the contacting rail causes the eared container to be moved laterally on the conveyor and from the dead plate. The container as it is moved from the dead plate onto the adjacent high speed conveyor chain ceases rotation and with both high speed conveyor chains now carrying and moving the container, it, the container, moves forwardly at the speed of the high speed chains. The now-oriented container is transported for a short distance whereupon the high speed chains may be directed downwardly to bring the container upon a continuation portion of the slow speed conveyor chains or other slower pair of conveyor chains whereupon the container is moved forwardly at the speed of this slower conveyor and with the ears in an aligned position. The oriented container may also be delivered to other apparatus directly from the high speed chains.

It is an object of this invention to provide an orienting conveyor adapted to receive eared containers with their ears in random orientation and spacing to feed them onto the orienting conveyor. As the containers are advanced on said conveyor they are caused to separate and to be rotated for orientation and with the containers rotated to bring the ears to a determined relationship to the line of movement of the containers. The oriented container is then caused to be advanced in said oriented position on the conveyor for discharge for later operations.

It is a further object of this invention to provide an orienting conveyor having a first pair of spaced traveling chains and a second pair of faster traveling chains disposed adjacent the first pair of chains. Said conveyor having means for guiding a succession of randomly oriented eared containers onto the first pair of chains, and as the conveyor is advanced, the container is caused to be moved onto the faster traveling second pair of chains. The container as it is advanced is urged from one of the chains and onto a dead plate and by the propulsive force on one side of the container and the restraint on the other side of the container is rotated until an ear of the container is brought in the way of an ear contacting bar whereupon the container is moved from the dead plate onto the faster equally travelling chains to travel forwardly in a determined oriented position for transfer to and further advancement on a slower traveling pair of chains.

It is a still further object of this invention to provide an orienting conveyor apparatus adapted to receive a series of like sized containers having similarly disposed ears thereon, and adapted for feeding the containers at a rate in excess of sixty units per minute and in a randomly oriented manner to a conveyor means having a guide means adapted for receiving and advancing the incoming containers on their bottoms and at a determined speed to a conveyor section having a pair of conveyor chains traveling at a higher speed than the incoming conveyor means and on said pair of chains to accelerate the speed of the containers; means for laterally moving the containers on the high speed conveyor section so that the container is carried by one of the high speed conveyor chains and by a fixed member so that the container is rotated on its bottom and in its rotation to bring an ear in the way of an ear contacting means and in the engagement therewith to move the container laterally from engagement with the fixed portion and onto the two high speed conveyor chains.

There has been outlined rather broadly the most important features of the orienting conveyor of this invention in order that the present contribution to the art may be more fully appreciated. Those persons skilled in this art will appreciate that the concept on which the present orienting conveyor is based may be utilized as a basis for designing similar structures carrying out the purposes of this invention.

BRIEF DESCRIPTION OF THE DRAWINGS

FIG. 1 represents a side view of the orienting conveyor with portions broken away to show the internal arrangement of the conveying chains providing propulsive portions thereof;

FIG. 2 represents a plan view of the conveyor with portions broken away to show certain lower portions and looking downwardly in the direction of the arrows 2—2 of FIG. 1;

FIG. 3 represents a transverse sectional view through the conveyor as taken on the line 3—3 of FIG. 2 and showing an eared container as carried upon a first pair of conveyor chains;

FIG. 4 represents a transverse sectional view through the conveyor as taken on the line 4—4 of FIG. 2 and showing a container after it has moved from the first pair of conveyor chains to a faster second pair of conveyor chains;

FIG. 5 represents a transverse sectional view through the conveyor and further downstream and showing the relationship of the conveyor chains and an eared container and with the eared container having been moved from one of the second pair of chains onto a dead plate, the view taken on the line 5—5 of FIG. 2;

FIG. 6 represents a transverse sectional view further downstream of the conveyor and showing an eared container with its ear in contact with an ear engaging rail and with the container moved again onto the two faster chains, the view taken on the line 6—6 of FIG. 2;

FIG. 7 represents a transverse view further downstream of the conveyor chains, the view taken on the line 7—7 of FIG. 2;

FIG. 8 represents a transverse view further downstream of the conveyor and showing the eared container in an oriented position and being transported by the downstream discharge conveyor chains, the view taken on the line 8—8 of FIG. 2;

DESCRIPTION OF THE PREFERRED EMBODIMENT

Figure 14:
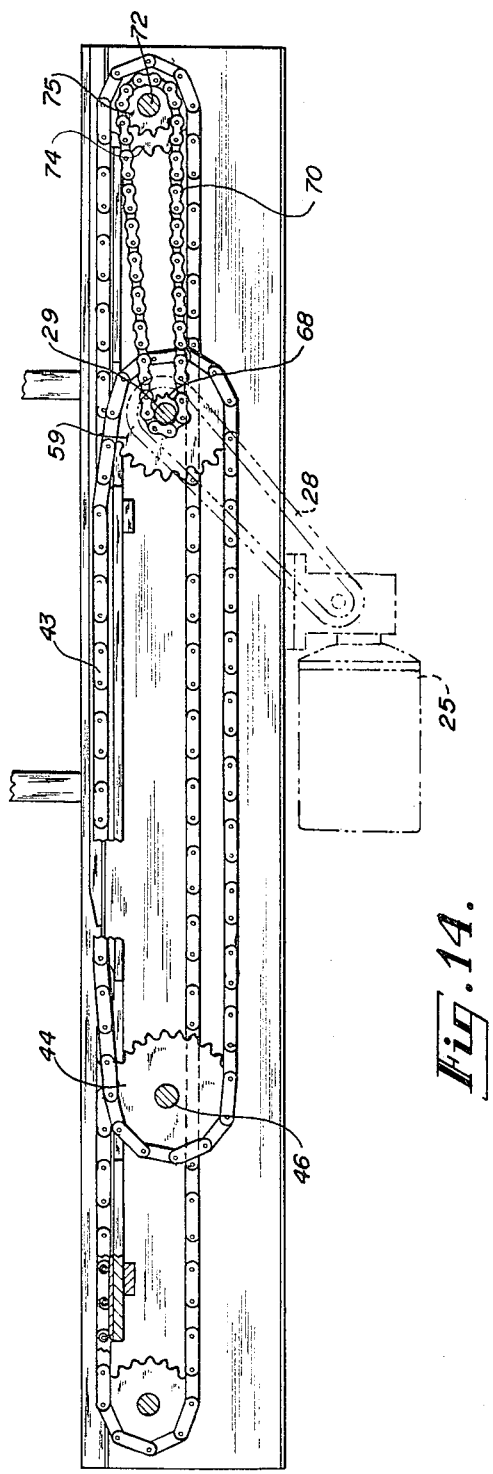
FIG. 14 represents a sectional side view of the conveyor and showing in particular a preferred drive arrangement of the orienting conveyor of the invention.

Referring now to the drawings in detail in which like members refer to like numbers throughout the drawings and in particular to FIGS. 1, 2 and 14 wherein there is provided a frame 20 carried by base supports 22 and having side members 23 and 24 which side members are formed as extended angles having the short leg portions thereof extending toward each other and providing the upper horizontal surface of the conveyor base. Attached to the bottom side of the conveyor frame is a gear motor 25 carrying upon its output shaft a sprocket 26 engaging and driving a roller chain 28 so as to rotate a driven shaft 29 which, as it is rotated, rotates or drives all of the chains of the conveyor.

As particularly seen in FIGS. 1, 2 and 3 there is mounted on the upper portion of each side member 23 and 24 guide rail 30 above side member 23. Between the rails is provided a pair of conveyor chains 32 and 33 and, as reduced to practice, each chain travels at the same rate of speed. A freely rotating tail shaft 34 is mounted in the frame and has mounted thereon a pair of like-sized sprockets 35 and 36, each of which is set screwed to the shaft 34 and each carries a chain.

As seen in FIG. 3 the upper lengths of the chain 32 and 33 are maintained in a common plane by means of chain support slides 37 and 38. These support slides prevent the chains from sagging in their upper extent of chain between the sprockets from the drive shaft to the inlet end. An eared container 40 is carried by the chains 32 and 33 and as it is fed and transported the lower rolled edge or end of the container is guided by rails 30 and 31.

Moving downstream in the direction of the arrows and to the position indicated as 4—4 on FIG. 2 and referring in particular to FIG. 4 it is to be noted that the container 40 has moved onto and is carried upon a second pair of chains 42 and 43, which chains are disposed adjacent to but exteriorly of the chains 32 and 33. These chains 42 and 43, as exemplified, operate at a lineal speed much greater than the chains 32 and 33. The near high speed chain is identified as 42 and the far high speed chain is identified as 43. These chains are carried on sprockets 44 and 45 rotated with and carried on a tail shaft 46 mounted between the side rails 23 and 24. This shaft 46 is freely rotated as the chains 44 and 45 are moved.

Referring particularly to FIGS. 1 and 4 it is seen that the upper extent of the chains 42 and 43 are directed upwardly by means of contoured chain support bars 48 and 49. In this embodiment, carrying chain 42 has a more rapid and higher elevation than the support bar 49 carrying chain 43 so that the container 40 as it is advanced upwardly is also at the same time tilted. It is also to be noted particularly in FIG. 4 that the guide bar 31 insures that the bottom of the container 40 as it is moved forwardly is in or nearly in engagement with guide bar 30.

Referring next to FIGS. 1 and 5 it is to be noted that the guide rail 31 has been terminated and the container 40 as seen in FIG. 5 is disposed on chain 42 and dead plate 50 for rotation as it is advanced. The guide rail 31 terminates at a point just prior to where the container is brought in the way of a dead plate or bar 50 which dead plate has, as seen in FIG. 2, an upwardly inclined surface or slope 51 whereupon the far side of the container 40 is cammed from the high speed chain 43 and onto dead plate 50 which provides a means for supporting one side of the container. The container continues to be advanced by the high speed chain 42 whereupon the container as it is advanced by chain 42 is caused to rotate in a counterclockwise manner as viewed in FIG. 2.

Referring next to FIGS. 1, 2 and 6 with FIG. 6 being taken at a point slightly further downstream on the conveyor. Guide rail 31 is not shown as it was terminated at a point approximately at the end of the upward incline of the high speed chain. The container 40, which as illustrated, has rotated to the extent where an ear 52 on container 40 has moved in the way of an ear guide bar 54 which is carried by uprights 55 attached by means of screws 56 to the side member 23. As the ear of the container engages the bar 54 the container is caused to be moved laterally from the dead plate 50 and onto chain 43 so that the rotating force on the container caused by chain 42 and dead plate 50 is stopped with the container now being carried by equally advancing high speed chains 42 and 43. The ears of the container are now at right angles to the path of the conveyor as the container is moved forwardly and in the desired oriented position.

Referring next to FIG. 7 and the oriented container thereon, it is to be noted that the chain support bar 48 is reduced in height so that chain 42 is lower than in FIG. 6. At this station of the conveyor the support bar 48 is brought into substantially the same elevation as the support bar 49 so that the container 40 on advancing chains 42 and 43 is brought into or nearly into a vertical condition so as to be in position for a smooth transfer to other conveyor chains to be described in conjunction with FIG. 8.

Referring next to FIGS. 1, 2 and 8 it is to be noted that at this station the ear contacting bar 54 has terminated and that the upper extent of the high speed chains 42 and 43 have been directed downwardly and over a pair of driving sprockets 58 and 59 carried by a driving shaft 29. The upper extent of the high speed chains as they are brought below the upper surface of the slower speed chains 32 and 33 cause the container carried thereon to be brought in the way of and onto the slow speed chains 32 and 33. These chains are carried in a parallel and level relationship to the frame by the chain support bars 37 and 38. The container 40 is also retained and guided between the side of the dead plate 50 and a new side retaining bar 62 which is mounted upon the horizontal upper extent of the side member 24.

Figure 9:
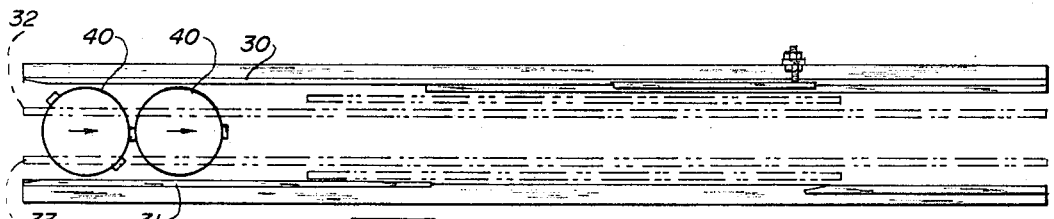
FIGS. 9, 10, 11, 12 and 13 represent somewhat diagrammatic plan views of the orienting conveyor of FIGS. 1 and 2 and showing the relationship of adjacent eared containers as they are advanced thereon to show the eared containers in various stages of orientation as they are advanced through the orienting conveyor.

Referring next to FIGS. 9 through 13, there is provided a diagrammatic plan view of the sequence of the orienting of the container. As seen in FIG. 9, two containers 40 have been delivered to the slower infeeding chains 32 and 33 and between the guide rails 30 and 31. The containers are adjacent each other and with the leading of the two containers having its ears substantially aligned with the longitudinal axis of the conveyor and the second container having its ears slightly at an angle to the longitudinal axis of the conveyor. These containers are shown as being in contact or nearly in contact with each other.

Figure 10:
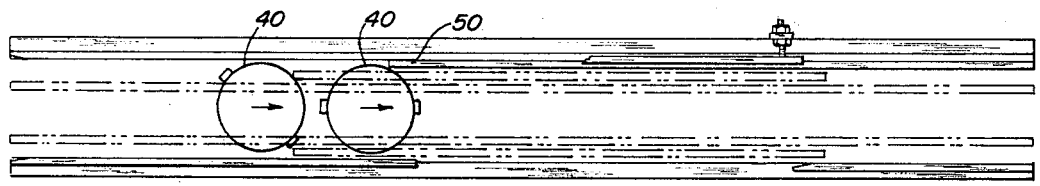

Referring next to FIG. 10, it is to be seen that as the leading container 40 is brought in the way of the high speed conveyor chains it is advanced or it is moved forwardly of the second container 40 so that there is a separation of the two containers. As the leading container 40 is moved forwardly it engages the dead plate or bar 50, and propelled by one side and restrained by the other, starts to rotate. As it is separated from and with a determined space between the two containers, the leading container is free to rotate counterclockwise and without any possibility of engagement with the second container 40.

Figure 11:
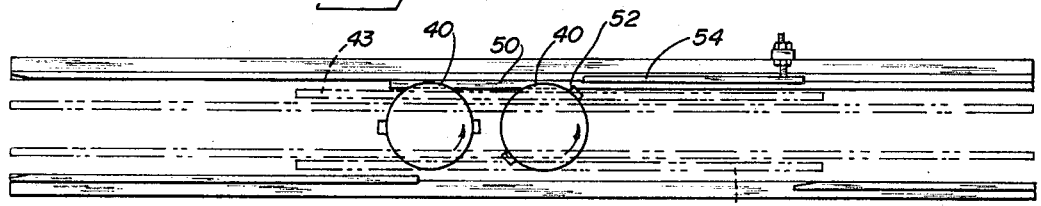

Referring next to FIG. 11, it is to be noted that the leading container 40 has one of its ears 52 approaching the ear contacting bar 54 and the second container has engaged the dead plate 50 and is beginning to be rotated as it is advanced on the high speed chain 42 and the dead plate 50.

Figure 12:
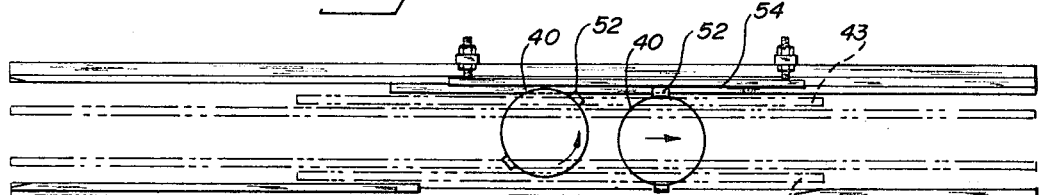

Referring next to FIG. 12, it is seen that the leading container 40 as its ear 52 engages the ear contacting bar 54 causes the now orientated container to be laterally moved from the dead plate 50 and to be carried on the two high speed conveyor chains 42 and 43 as seen in FIG. 6. The second container is continuing its rotation so that its ear 52 is approaching the ear contacting bar and is in the position as seen in FIG. 5.

Figure 13:
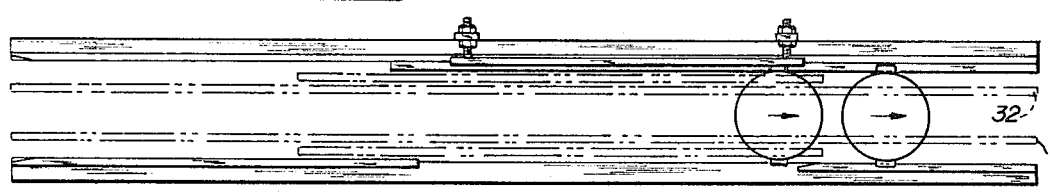

Referring next to FIG. 13, it is to be noted that the leading container is now oriented with the ears at right angles to the conducting path of the conveyor and has been moved from the high speed conveyor chains and onto the slower speed conveyor chains. The second container is also in the desired orientation and is leaving the high speed conveyor chains and is approaching the slow speed conveyor chains for discharging transport thereon. It is noted that as the two containers 40 are deposited and are both transported on the downstream or discharge portion of the slow speed conveyor they may approach and possibly contact each other; however, the alignment of the containers is not disturbed as the containers are advanced on equally traveling chains 32 and 33.

It is to be noted that any two containers on the slow speed conveyor chains 32 and 33 as they approach the high speed conveyor portion of the orienting conveyor may be in physical contact with one another and with their ears in any position in respect to each other or in respect to the path of the conveyor. As the leading container 40 is engaged by the high speed chains 42 and 43 and is lifted from the slow speed chains of the conveyor, the faster traveling high speed chains cause the leading container to move away from the next following container. The differential of speed between the slow and high speed pairs of chains as reduced to practice is twenty-five feet per minute for the slow speed conveyor chains 32 and 33 and thirty-five feet per minute for the high speed conveyor chains 42 and 43 so that on an orienting conveyor for one-gallon containers a leading one-gallon container 40 is caused to separate a distance of approximately three inches from the succeeding container as they are brought from the slow chains and onto the high speed chains. This distance is great enough to accommodate any possible differential of position of the ears in relation to the path of the conveyors. The three inch spacing permits any container to rotate so as to engage the contacting rail before the succeeding container engages the rail.

As reduced to practice, the container 40 is moved forwardly by the high speed chain 42 and is dragged forwardly on the dead plate 50 so that the container as it is moved forwardly and rotated travels at a speed less than the speed of the high speed conveyor; therefore, the container travels forwardly slower than the high speed conveyor until the ear 52 of the container engages the ear contacting bar 54. This rotating speed is greater however than the speed of the slow speed conveyor chains. At engagement of the ear to the bar the container is moved laterally onto the two high speed chains whence it advances at the speed of the high speed chains 42 and 43. Therefore, the differential of space between any two containers must be sufficient to accommodate the differential of forward travel of the container as it is rotated until it comes in the way of the ear contacting bar and to the speed of the container on the two chains 42 and 43. The dead plate 50, which in the present instance is a fixed bar, may, if desired, be made to be a conveyor chain traveling counterflow to the direction of travel of the high speed chain 43. In this manner a counterflow chain will cause the container to rotate even more rapidly to reduce the gross amount of forward rotative travel necessary to bring the ear into engagement with the ear contacting bar 54.

Referring next to FIG. 14 in particular and also to FIGS. 1 and 2 and the orientating conveyor drive as shown, wherein it is seen that from motor 25 the chain 28 rotates shaft 29 at a determined speed. The rotational speed of shaft 29 provides the driving means for the high speed conveyor chains 42 and 43 which are carried and driven by sprockets 58 and 59. These sprockets are attached to shaft 29 with sprocket 59 being seen in FIG. 14. The tail shaft 46 carrying sprockets 42 and 44 with only sprocket 44 being seen in FIG. 14 provides the upper horizontal extent for the high speed chain 43 carried on sprockets 44 and 59. From the driven shaft 29 the slow speed conveyor chains are driven by a roller chain drive including sprocket 68 carried on shaft 29 and driving a roller chain 70, in turn engaging and driving the head end shaft 72. Shaft 72 carriers two attached sprockets 73 and 74 with sprocket 74 being seen in FIG. 14, which sprockets carry the slow speed chains 32 and 33. The speed of the shaft 72 is regulated by means of the differential between the driving sprocket 68 and the driven sprocket 75 and, as seen, the drive ratio is approximately one to two-and-one-half in the present embodiment.

Referring to the drive in the particular embodiment above-described, it is noted that as the shaft 29 is revolved it moves the high speed conveyor chains 42 and 43 at a determined rate of speed and at the same time the sprocket 68 carried on shaft 29 drives roller chain 70. This chain drives the driven sprocket 75 causing the head and shaft 72 to revolve and also the attached sprockets 73 and 74 rotating therewith to carry and drive the slow speed chains 32 and 33 at a determined slower speed than the speed of the high speed chains 42 and 43.

Figure 15:
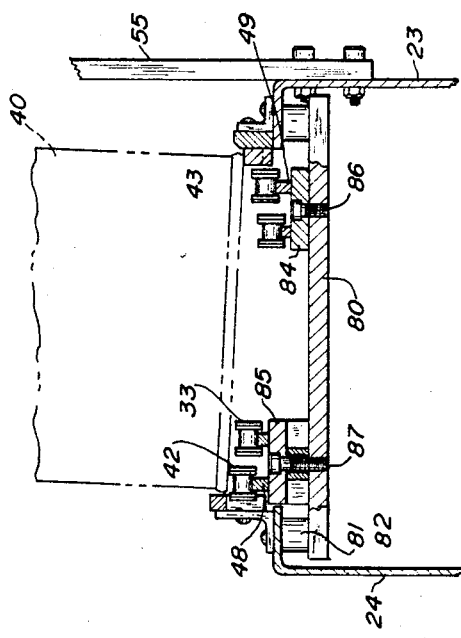
FIG. 15 represents in an enlarged view a transverse sectional view showing a container as it is rotated by one high speed chain and a dead plate.

Referring again in particular to FIGS. 14 and 15 it is to be noted that the upper horizontal extents of both the slow speed and high speed conveyor chains are mounted upon supports which carry chain support slides 37 and 38 and the chain support bars 48 and 49. As reduced to practice, a plurality of transverse bars 80 are supported and spaced by means of spacers and screws 81 and 82 and are attached to the underside of the inwardly turned portion of the side members 23 and 24. Upon these transverse bars 80 there are provided longitudinal members 84 and 85 which are attached to the bars 80 by means of cap screws 86 and 87. It is to be noted that in FIG. 15 that the intermediate upper extent of the high speed chains are raised a different amount so that chain 42 is higher than chain 43 and the container 40 thereon is tipped toward the right.

For many reasons it may be determined that the container is not to be tipped or tilted as in the embodiment shown and described in conjunction with FIGS. 4, 5 and 6 in which case the chains 42 and 43 are maintained in a plane substantially parallel to the top of the conveyor base 20. The chain support bars 48 and 49 are made of a similar size and contour and rather than rely on gravity to move and maintain the container 40 in sliding contact with guide rail 30, the guide rail 31 is mounted so that its inside face engages the lower rim of the container 40 when the container is other than in the desired advancing path to engage dead plate 40. The guide rail 31 as thus disposed may move the container 40 laterally on the chains and toward or to guide rail 30, however it is only necessary that the container be positively advanced so that the bottom bead or edge is brought onto the dead plate 50.

The chain 43 is supported so as to be lower than the dead plate 50 beginning at a point substantially opposite the termination of guide rail 31. Once the container is brought into rotating engagement with chain 42 and the dead plate 50, the propulsive effect of the chain on the one side of the container urges the container onto the dead plate 50. In an orienting conveyor assembled for level transport of the container the guide rail 31 need be only slightly higher than the lower bead or rolled edge of the container, and the rail 31 terminates as it does in the conveyor described in conjunction with FIGS. 3 through 6. The differential of height between the dead plate 50 and the chain 42 need be only about one-thirty-second of an inch, but in level orienting conveyors it is customary to have a differential of from one-sixteenth to one-eighth of an inch.

USE AND OPERATION

It is to be noted as above-described that the containers 40 as they are fed to this orienting conveyor require no means for precise spacing and that the containers may be fed thereto in any random manner with the ears oriented in any position. The ears of the adjacent containers may be substantially in engagement with each other. However, this engaging condition of the container which is normally a disadvantage with most orienting devices is not a factor in the present invention. A precise or a predetermined minimum separation of adjacent containers is provided by the moving of the leading container from a slower speed conveyor onto a higher speed pair of conveyor chains. This speed-up insures that a determined separation is made before the container is begun to be rotated to bring an ear or projection into a precise orientation of the ear or projection to the path of the container.

It is to be further noted that each container is rotated with the one side of the bottom edge of the container being propelled forwardly by a high speed conveyor chain, in particular chain 42, and the other side of the container is resting upon the dead plate. The functional resistance or drag of the dead plate and the forward propulsion of the conveyor chain causes the container to rotate with a rotating effect which is the same whether the container is empty or is full. In particular, it is found that a one-gallon container when filled with lead base paint is particularly adept at being oriented with the ears disposed in the determined position as desired for the application of a bail to the ears at a later operation. The speed of the conveyor chains may be changed to accommodate one-gallon, two-gallon, two-and-one-half gallon or five-gallon containers as desired. The size of the containers and the speeds necessary to accommodate the various conditions under which the cans may be oriented and fed to later operations also is a consideration in the design of the orienting conveyor.

The orienting means as exemplified by the above-described conveyor is not only adapted for orienting eared containers for the application of bails thereto but also may be used for applying labels having holes therein in which the ears are projected through the holes and the label is applied as by gluing to the exterior wall of the container.

Oriented containers such as bottles and the like and upon which labels and seals are applied also require a precise orienting means. Such an orienting device is provided in the orienting conveyor exemplified where one side of the container is propelled and the opposite side of the container is moved onto a dead plate until a protruding portion of the container is brought in the way of an engaging bar so as to push the container from the dead plate onto a pair of forwardly and equally traveling chains. The slow speed conveyor chains exemplified need not be two strands of chains traveling at the same rate of speed but may be a single flat plate type conveyor chain upon which the container may be brought onto the pair of high speed chains adapted to transport and orient the container and after orientation deliver the container to the slow speed conveyor or other apparatus. When desired, the slow speed conveyor may be made in two different sections with power to drive the input slow speed conveyor portion being derived from a roller chain drive extending from shaft 29 to a shaft carrying one end of the slow speed conveyor chain.

METHOD

The operation of this orienting device provides a method whereby randomly-oriented eared containers are fed to a conveyor and, without the use of a gate for separation and feeding in a spaced relationship, are oriented in a precise and determined manner. Therefore, the orienting of eared containers by this method includes the following steps: advancing containers one at a time and in a random manner to and upon a conveying device to provide a forward propulsion of containers at a determined speed and without rotation; transferring the containers from said conveying device onto a pair of higher speed conveying chains so as to provide a determined separation of adjacent containers; moving the leading container from one of the higher speed conveying chains onto a dead plate so that the container is supported by one chain and the dead plate; rotating the container as it is moved forwardly until an ear or protrusion on the container is brought into engagement with a contacting rail; moving the container laterally from the dead plate and onto a high speed conveying chain traveling at the same rate as the other conveying chain, the container as it is moved forwardly at the speed of the high speed chains being disposed in an oriented position to the conveyor; and delivering the container in said oriented position to either a slower speed conveyor means or to a further operation apparatus such as for bail or label applying.

Terms such as "left," "right," "up," "down," "front," "back" and the like are applicable to the embodiment shown and described in conjunction with the several drawings. These terms are merely for the purposes of description and do not necessarily apply to the position in which the orientating conveyor apparatus may be constructed or used.

The conception of the orientating conveyor apparatus and method of operation and its many applications is not limited to the specific embodiment shown but departures therefrom may be made within the scope of the accompanying claims and without sacrificing its chief advantages and protection is sought to the broadest extent the prior art allows.

What is claimed is:

1. In an orienting conveyor adapted to receive eared containers and the like in a random orientation and on their bottoms and, absent a gate spacing means, to feed them onto the conveyor and rotate each container so that its ear and the like is brought into and is maintained in a determined relationship to the path of the conveyor, said orienting conveyor comprising: (a) a support base; (b) a receiving conveyor carried by the base and adapted to receive eared containers and the like in a random manner and, at the determined speed of the receiving conveyor, to transport the containers forwardly; (c) means for guiding the incoming containers in a determined path on the receiving conveyor; (d) a pair of conveyor chains carried by the base and moving at a faster speed than the receiving conveyor and adapted to receive the container from the receiving conveyor and to transport this container on its bottom at said faster speed; (e) means for rotating the container around its axis by moving the container from a first higher speed conveyor chain and to a means for supporting one side of the bottom of the container as the other side of the bottom of the container is transported forwardly by the second high speed conveyor chain; (f) an engaging bar spaced so as to engage an ear and the like of the container as it is rotated and by the engagement of the ear with the bar to laterally move the container from the means for supporting the container and onto the first higher speed conveyor chain to stop the rotation of the container, and (g) means for delivering the oriented container from the speed conveyor chains.

2. An orienting conveyor as in claim 1 in which the means for rotating the container includes the second high speed conveyor chain and the means for supporting one side of the bottom of the container is a dead plate positioned adjacent a first higher speed conveyor chain.

3. An orienting conveyor as in claim 1 in which the means for rotating the container includes the second high speed conveyor chain and the means for supporting one side of the bottom of the container is a conveying means moving counterflow to and adjacent the first high speed conveyor chain.

4. An orienting conveyor as in claim 1 in which the means for guiding the incoming containers is a pair of guide rails carried by the base and with one rail disposed on each side of the receiving conveyor the rails spaced so as to slidably guide the containers as they are fed to and on the incoming conveyor.

5. An orienting conveyor as in claim 1 in which the receiving conveyor is adapted to receive and transport the containers at a rate of speed at least equal to the speed at which they are fed to the orienting conveyor.

6. An orienting conveyor as in claim 1 in which the receiving conveyor is of greater extent than the upper extent of faster pair of conveyor chains, the receiving conveyor adapted to additionally receive the oriented container as it is fed from the faster pair of chains and to transport the containers at the receiving speed and to a delivery point providing thereby the means for delivering the containers from the orienting conveyor.

7. An orienting conveyor as in claim 6 in which the means for guiding the incoming containers is a pair of guide rails carried by the base and with one rail disposed on each side of the receiving conveyor and spaced to slidably guide the containers as they are fed to and on the incoming conveyor, and in which there are provided a pair of guide rails on the discharge portion of the conveyor to slidably define the path of the oriented container as it is discharged from the conveyor.

8. An orienting conveyor as in claim 1 in which the faster speed conveyor chains are carried on chain support bars, one bar being sized so that a substantial portion of the chain's upper extent carried thereon is higher than the other high speed chain and so that the container is tilted toward the means for supporting the one side of the container, which means is higher than the high speed chain adjacent thereto.

9. An orienting conveyor as in claim 8 in which the means for rotating the container includes the second high speed conveyor chain and the means for supporting one side of the bottom of the container is a dead plate positioned adjacent a first higher speed conveyor chain.

10. An orienting conveyor as in claim 1 in which the receiving conveyor is of a greater extent than the faster pair of conveyor chains, the receiving conveyor adapted to additionally receive the oriented container as it is fed from the faster pair of chains and to transport the containers at the receiving speed and to a delivery point providing thereby the means for delivering the containers from the orienting conveyor; and in which the means for guiding the incoming containers is a pair of guide rails carried on the base and disposed on each side of the receiving conveyor on the incoming portion; and in which there is a pair of guide rails disposed on each side of the outgoing portion and spaced so as to define a path for the container as it is transported on the receiving conveyor; and in which the means for rotating the container includes the second high speed conveyor chain and the means for supporting one side of the bottom of the container is a dead plate positioned adjacent a first higher speed conveyor chain.

11. The method of orienting a multiplicity of eared containers and the like as they are fed on their bottoms and in a random manner, the method including the following steps: (a) advancing containers one-at-a-time and in a random and unspaced manner to and upon a conveying device to provide a forward propulsion of said containers at a determined speed and without rotation; (b) transferring the containers one-at-a-time and as they are received from said conveying device onto a pair of higher speed conveying chains so as to provide a determined separation of adjacent containers; (c) moving the leading container from one of the higher speed conveying chains onto a means for supporting one side of the container so that the container is supported by one advancing high speed chain and the means for supporting the container; (d) rotating the container as it is moved forwardly until an ear and the like is brought into engagement with a contacting rail; (e) moving the container laterally from the means for supporting the container and onto the adjacent high speed conveying chain traveling at the same rate of speed as the other high speed conveying chain, the container as it is moved forwardly at the speed of the high speed chains being disposed in the desired oriented position to the path of the conveyor; and (f) delivering the container in said oriented position to further operations.

12. The method of orienting eared containers as in claim 11 in which the means for supporting the container is a dead plate adjacent to and slightly above the high speed conveyor chain.

13. The method of orienting eared containers as in claim 12 in which the second high speed chain has a substantial portion of its upper extent at a higher level than the dead plate so that the axis of the container as it is advanced is tilted from the general plane of the conveyor and toward the dead plate.

14. The method of orienting eared containers as in claim 13 in which the container is delivered from the high speed conveyor chains to a slower speed conveyor means for delivery from the orienting conveyor.

15. The method of orienting eared containers as in claim 14 in which there is provided the additional step of guiding the containers as they are fed to and from a conveyor device of determined speed not less than the speed of the containers as they are randomly fed to an orienting conveyor.

References Cited

UNITED STATES PATENTS

| 3,047,123 | 7/1962 | McKay | 198—33 |
| 3,142,371 | 7/1964 | Rice | 198—33 |

FOREIGN PATENTS 628,908  11/1961  Italy.

RICHARD E. AEGERTER, *Primary Examiner.*